United States Patent [19]

Neff

[11] 4,338,816

[45] Jul. 13, 1982

[54] FUEL-CONSUMPTION MONITOR FOR DIESEL ENGINE

[75] Inventor: Georg Neff, Munich, Fed. Rep. of Germany

[73] Assignee: E. Gunter Bernstorf, Sinsheim, Fed. Rep. of Germany

[21] Appl. No.: 169,143

[22] Filed: Jul. 15, 1980

[30] Foreign Application Priority Data

Jul. 18, 1979 [DE] Fed. Rep. of Germany ........ 2929045

[51] Int. Cl.³ .............................................. G01F 9/00
[52] U.S. Cl. ................................................ 73/119 A
[58] Field of Search ..................... 73/119 A, 168, 431, 73/113, 114

[56] References Cited

U.S. PATENT DOCUMENTS

| | | | |
|---|---|---|---|
| 2,271,144 | 1/1942 | McKay | 73/113 |
| 2,333,834 | 11/1943 | Vetter | 73/431 X |
| 3,750,463 | 8/1973 | Erwin, Jr. | 73/113 |
| 4,134,301 | 1/1979 | Erwin, Jr. | 73/119 A X |

Primary Examiner—Jerry W. Myracle
Attorney, Agent, or Firm—Karl F. Ross

[57] ABSTRACT

A fuel-feed line extends from a diesel-fuel tank to a fuel pump for a diesel engine and the upstream side of this fuel pump is connected via a return line back to the tank. A feed flow meter is provided in the feed line for measuring flow therein and a return flow meter is provided in the return line. A common housing carries both of these flow meters so that the difference between the two measured flows, which constitutes the fuel consumed by the engine, can easily be calculated.

6 Claims, 6 Drawing Figures

FUEL-CONSUMPTION MONITOR FOR DIESEL ENGINE

FIELD OF THE INVENTION

The present invention relates to a fuel-consumption monitor for a diesel engine.

BACKGROUND OF THE INVENTION

In these days of high fuel costs a fuel-consumpmption monitor can allow the operator of a combustion engine, for instance the driver of a car, to operate the engine in the most efficient possible manner, and to keep track of the precious fuel. This can be done relatively easily in a gasoline engine by providing a flowmeter in the fuel line leading from the gas tank to the fuel pump. The meter can be set up to display the instantaneous rate of flow in units of volume per units of time, as well as the overall amount of flow in simple units of volume.

In a diesel engine, however, the problem is substantially more complex. Fuel is drawn through a feed line from the tank by means of a pump and is supplied to injectors of the diesel engine under high pressure. A return line allows fuel not injected in the engine to be returned to the tank. In order to fit out such an engine system with a fuel-consumption monitor a control arrangement is provided between the pump and the tank. The return line is fed back to this control arrangement which in turn operates the pump at such a rate as to keep the pumped amount of fuel substantially equal to the consumed amount. A flowmeter provided between this control arrangement and the tank can, therefore, give a rough figure of fuel consumption.

Such a system has the considerable disadvantage that it is quite expensive. Furthermore the device does not provide a readout of the instantaneous rate of fuel consumption. Furthermore such arrangements are normally set up so that the fuel consumption is read with some difficulty and only periodically. Therefore the devices do not allow a person to adjust his or her driving habits for greatest fuel efficiency.

OBJECTS OF THE INVENTION

It is therefore an object of the instant invention to provide an improved fuel-consumption meter for a diesel-engine system.

Another object is to provide such a monitor which can display the instantaneous fuel-consumption rate so that the driver of the vehicle embodying the engine system can adjust his or her driving for greatest fuel economy.

Another object is to provide such a monitor which can be reset so that fuel consumption for a given drive can be calculated easily.

Yet another object is to provide such a fuel-consumption monitor which can be produced at relatively low cost, yet which will have a long service life.

SUMMARY OF THE INVENTION

These objects are attained according to the instant invention by providing respective flowmeters in the fuel-feed line of the diesel-engine system and in the return line so that the difference between the two measured flows can readily be ascertained, this difference obviously being the fuel consumption.

The flowmeters can be of the standard vane or annular-piston type, or can even be of the newer electronic type having a permanent magnet that is rotated by the flow inside a closed compartment of nonmagnetic material so that a sensor outside the compartment can detect the magnet motion. In either case it is advantageous if the meters not only show the rate of flow, in units of volume per units of time, but also the overall flow in units of volume. A reset is normally provided for the latter display so that the operator of the diesel engine system can keep track of overall consumption during a given trip or the like.

It is also possible in accordance with the instant invention, in particular when using a magnetic-type flowmeter, to feed the output from the feed and return flow meters to a difference calculator. This can be done simply by algebraically adding the pulses from the two flowmeters after inverting those from the return flow meter so that they are subtracted from those coming from the feed flow meter. A printer connected to this difference calculator can provide a hard copy of this data. Such a system can therefore give a readout of the instantanous consumption. This is particularly useful in a diesel motor vehicle so that the driver can adjust his or her driving habits for best fuel economy.

The flowmeters according to this invention can also be of the flow-through type or volume-measuring type, with the flow rate of the fluid being calculated from the volume.

SPECIFIC DESCRIPTION

Figure 1:
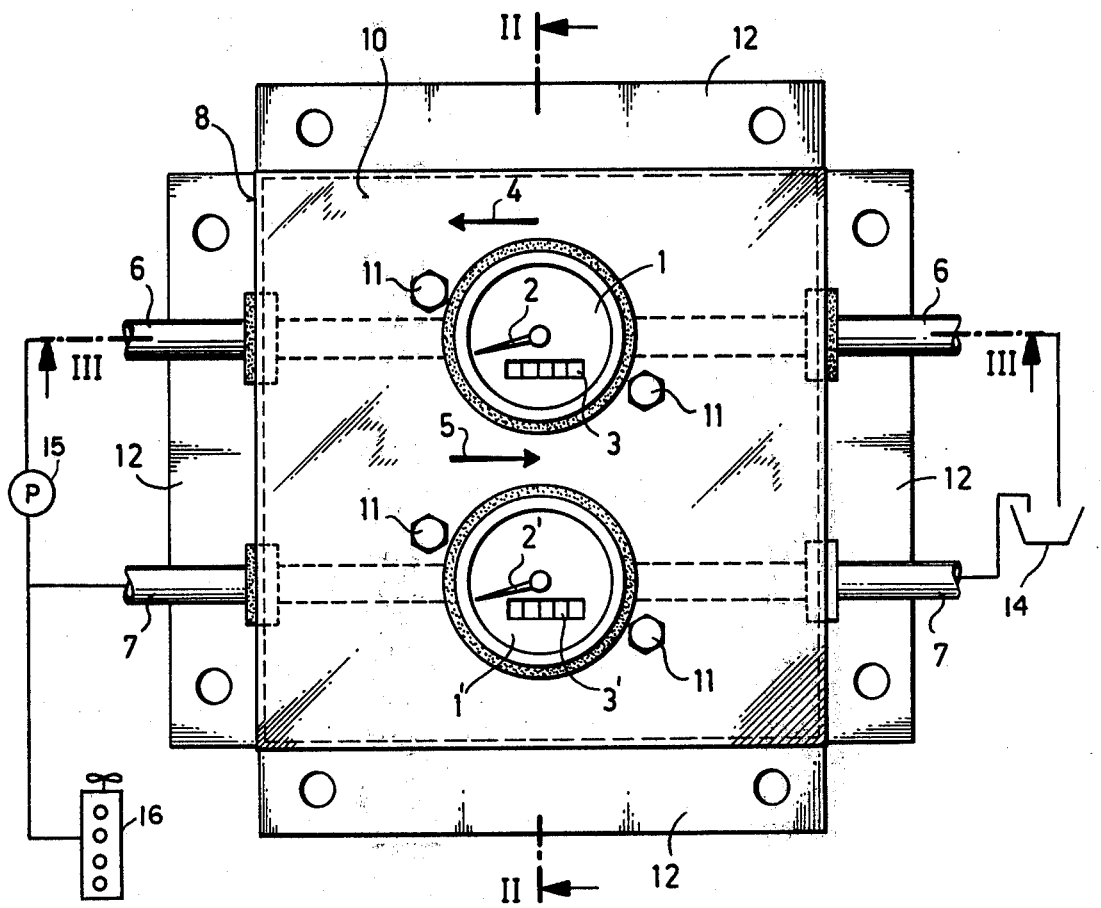
FIG. 1 is a top view of the fuel-consumption monitor according to the instant invention.
Figure 2:
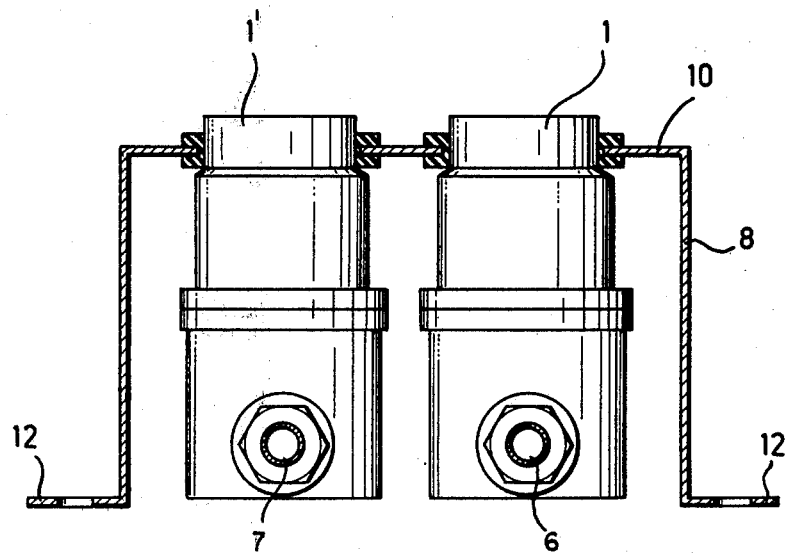
FIGS. 2 and 3 are sections taken respectively along lines II—II and III—III of FIG. 1.
Figure 3:
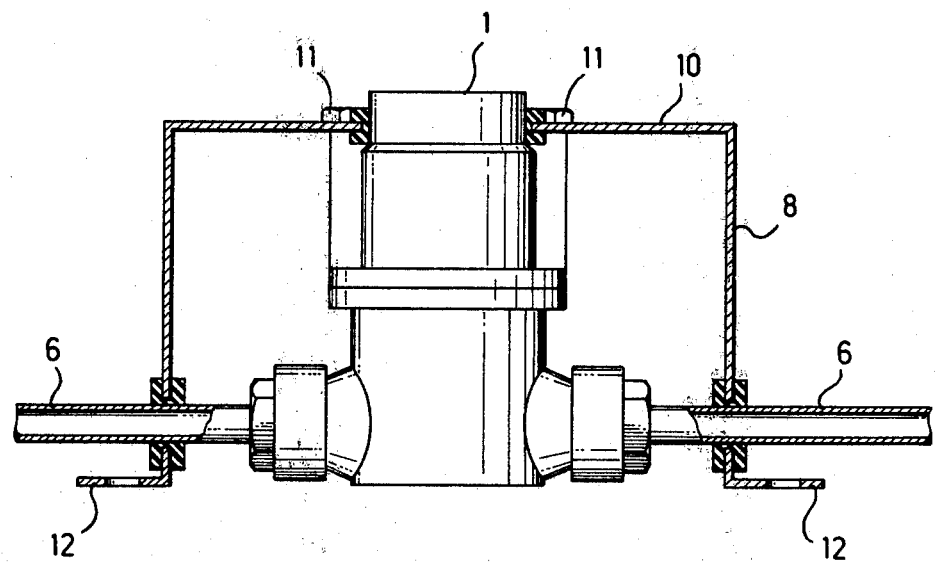
Figure 4:
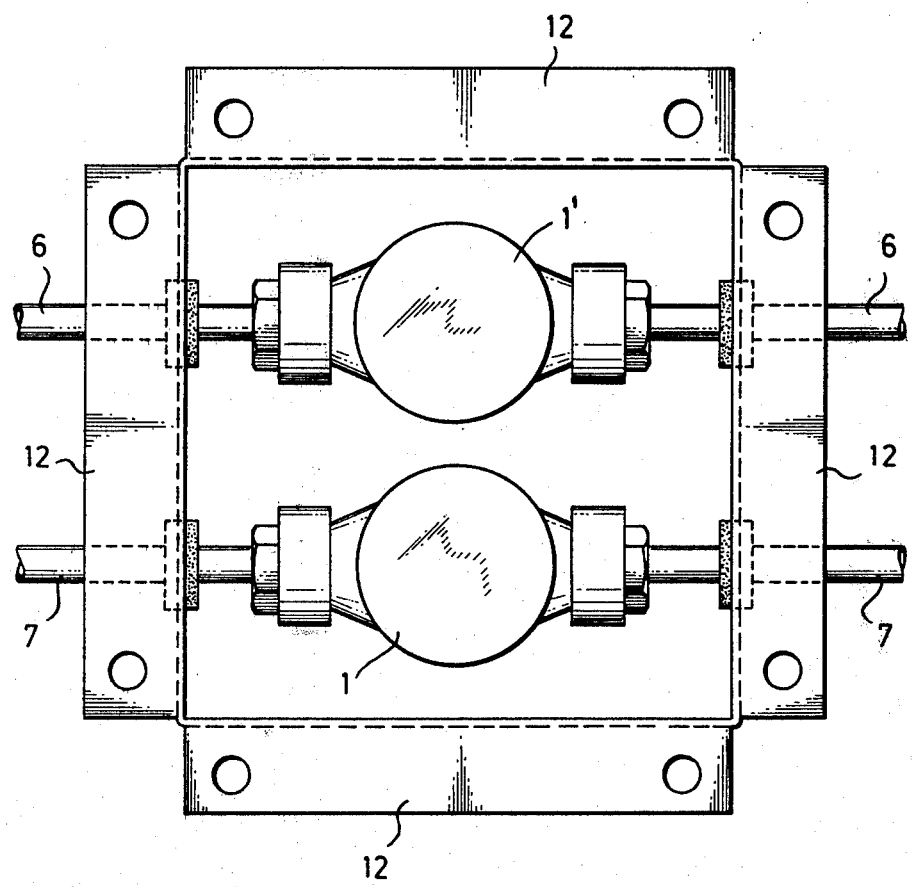
FIG. 4 is a bottom view of the monitor according to this invention.

As shown schematically in FIG. 1 a diesel engine 16 has a fuel tank 14 connected via a feed line 6 to a fuel pump 15 having an output connected both to the diesel engine 16 and to a return line 7 that leads back to the tank 14. The directions of flow in the lines 6 and 7 are indicated by arrows 4 and 5. The pump 15 creates upstream of itself an extremely high pressure for the injectors of the engine 16 in a manner well known per se. That fuel that is not injected into the cylinders of the engine 16 is returned via the line 7 to the tank 14.

According to the instant invention a flow meter 1 having a display 2 for flow rate and a display 3 for total flow is provided in line 6 and a similar such flow meter 1' having a rate display 2' and an overall display 3' is provided in the line 7. It is therefore possible for the user to compare the flows in the two lines 6 and 7 and determine the fuel consumption of the engine 16.

The two meters 1 and 1' are secured via screws 11 in the cover 10 of a box housing 8. This housing 8 has flanges 12 by means of which it can be securely bolted to the dashboard of a motor vehicle having the engine 16.

Figure 5:
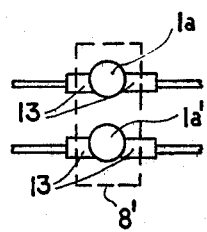
FIGS. 5 and 6 are small-scale largely schematic views showing further arrangements according to the present invention.

It is also possible as shown in FIG. 5 for two flow meters 1a and 1a' to have respective connections 13 and 13' which extend outwardly through the side walls of the housing 8' so that they can be directly connected to the hoses constituting the lines 6 and 7.

Figure 6:
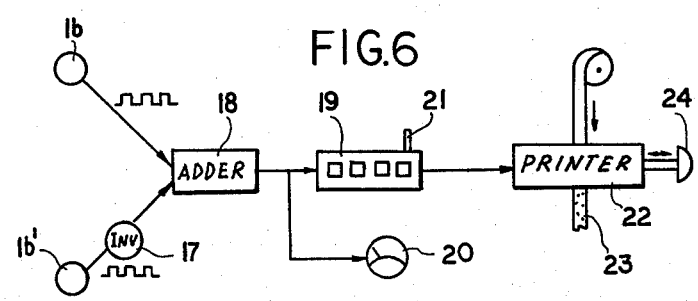

It is also possible as shown in FIG. 6 to employ electronic permanent magnet-type flow meters 1b and 1b' functionally equivalent to the flow meters 1 and 1'. The flow meter 1b' for the return line 7 is connected via an inverter 17 to an adder 18 to which the flow meter 1b for the line 6 is directly connected. The adder 18 therefore subtracts the amount of fuel returned to the tank from the amount of fuel drawn out of the tank so that its output represents the actual fuel consumption. This output is fed to a display 19 which shows the overall amount of fuel consumed and to a display 20 which shows the instantaneous rate of consumption. A reset button 21 is provided on the display 19 so that fuel consumption for a given trip of driving stretch can be readily measured. In addition a printer 22 can imprint the information of the display on a tape 23 either automatically or each time a print button 24 is depressed.

According to this invention the feed flow meter and return flow meter are connected parallel to each other for easiest comparison of their readings. They are both mounted in the housing 8 which substantially completely surrounds them so as to prevent tampering and which can be mounted at any convenient location in a motor vehicle embodying the engine system according to this invention.

I claim:
1. In combination with
a diesel engine,
a diesel-fuel tank,
a fuel-feed line extending from said tank to said engine,
a fuel pump in said line for drawing fuel out of said tank and supplying it to said engine, and
a return line connected between said pump and said tank for conducting fuel not used by said engine back to said tank, a fuel-consumption monitor comprising:
a housing;
a feed flowmeter upstream of said pump in said feed line in said housing for measuring flow in said feed line;
a return flowmeter in said return line in said housing for measuring flow in said return line, whereby the difference between the two measured flows constitutes the fuel consumed by said engine, said housing substantially surrounding said meters and having a wall on which both of said meters are mounted; and
means connected to both of said meters for calculating the difference between said flows and including a display mounted on said wall of said housing for displaying said difference.

2. The monitor defined in claim 1 wherein said housing is provided with flanges for mounting of same in a motor vehicle having said engine.

3. The monitor defined in claim 1 wherein said housing has side walls formed with slits, said meters having connections projecting through said slits.

4. The monitor defined in claim 1 wherein said meters have flexible hoses connected to the respective lines.

5. The monitor defined in claim 1 wherein each of said flowmeters includes a display that indicates the instantaneous rate of flow in the respective line and a display that shows the overall flow through the respective line in units of volume.

6. The monitor defined in claim 1, further comprising means for printing out said difference.

* * * * *